(12) United States Patent
Kanzaki

(10) Patent No.: US 8,473,840 B2
(45) Date of Patent: Jun. 25, 2013

(54) WEB PAGE EDITING

(75) Inventor: Eisuke Kanzaki, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 12/581,572

(22) Filed: Oct. 19, 2009

(65) Prior Publication Data

US 2010/0107053 A1   Apr. 29, 2010

(30) Foreign Application Priority Data

Oct. 27, 2008   (JP) ................ 2008-275388

(51) Int. Cl.
*G06F 17/28* (2006.01)
(52) U.S. Cl.
USPC ........................................................ 715/234
(58) Field of Classification Search
USPC ........................................................ 715/234
See application file for complete search history.

(56) References Cited

U.S. PATENT DOCUMENTS

| | | | |
|---|---|---|---|
| 7,512,696 B1* | 3/2009 | Ruble et al. | 709/230 |
| 2002/0008719 A1* | 1/2002 | Miyawaki et al. | 345/764 |
| 2004/0261023 A1* | 12/2004 | Bier | 715/530 |
| 2005/0165623 A1* | 7/2005 | Landi et al. | 705/2 |

FOREIGN PATENT DOCUMENTS

| | | |
|---|---|---|
| JP | 07-295994 | 10/1995 |
| JP | 09-081475 | 3/1997 |
| JP | 2007-149016 | 6/2007 |

* cited by examiner

*Primary Examiner* — Laurie Ries
*Assistant Examiner* — Tionna Smith
(74) *Attorney, Agent, or Firm* — A. Bruce Clay

(57) ABSTRACT

A web page to be edited has at least one web part. The web part can be a managed part with an identifier or an unmanaged part without an identifier and is stored in a computer readable medium. A mutual conversion section allows the web part to be converted from a form of the managed part with an identifier to a form of the unmanaged part without an identifier. After conversion, a new web part which was not stored in the computer readable medium is detected and inserted into the web page.

18 Claims, 7 Drawing Sheets

WEB PAGE EDITING

BACKGROUND

The present invention relates to web page editing, and in particular to editing a web page by changing the form of an identifier which identifies each part included in the web page to change an attribute of the part.

Content management systems (CMS) may incorporate an editing section with a web page file editing function into a browser of a terminal apparatus for displaying a web page as a plug-in. According to this technique, it is possible to provide a content management program capable of managing contents on a server. However, in conventional CMS, content that is to be created and a template forming a page, are completely separate. Thus, it is necessary for a user to create a template determined by the CMS when changing the design of a page. Therefore, a user who is going to create content tends to create a page in accordance with an existing template in order to save time and effort.

BRIEF SUMMARY

Web page content is managed and edited in a single environment. A web part which is part of a web page can be converted into a different web part. Information about the web part is extracted from the web page. A web parts management list is created, and a web part with its content can be retrieved from the web parts management list on the basis of any given characteristic. A new web part is generated from the retrieval, and the generated web part is inserted into the web page.

DETAILED DESCRIPTION

Embodiments of the present invention are described below with reference to the drawings. The embodiments are only examples, and the technical scope of the present invention is not limited thereto. As used herein, the term "web part" is a cluster of hypertext which can be embedded in a web page and in which areas exist for including contents. Hypertext is typically described in an HTML (hypertext markup language) format. The term "web page(s)" used in this specification includes any page or all pages managed by a web site. The term "part" included in "managed part," "unmanaged part," and the like is synonymous with "part" included in "part generator," "contents parts DB," and the like.

Figure 1:
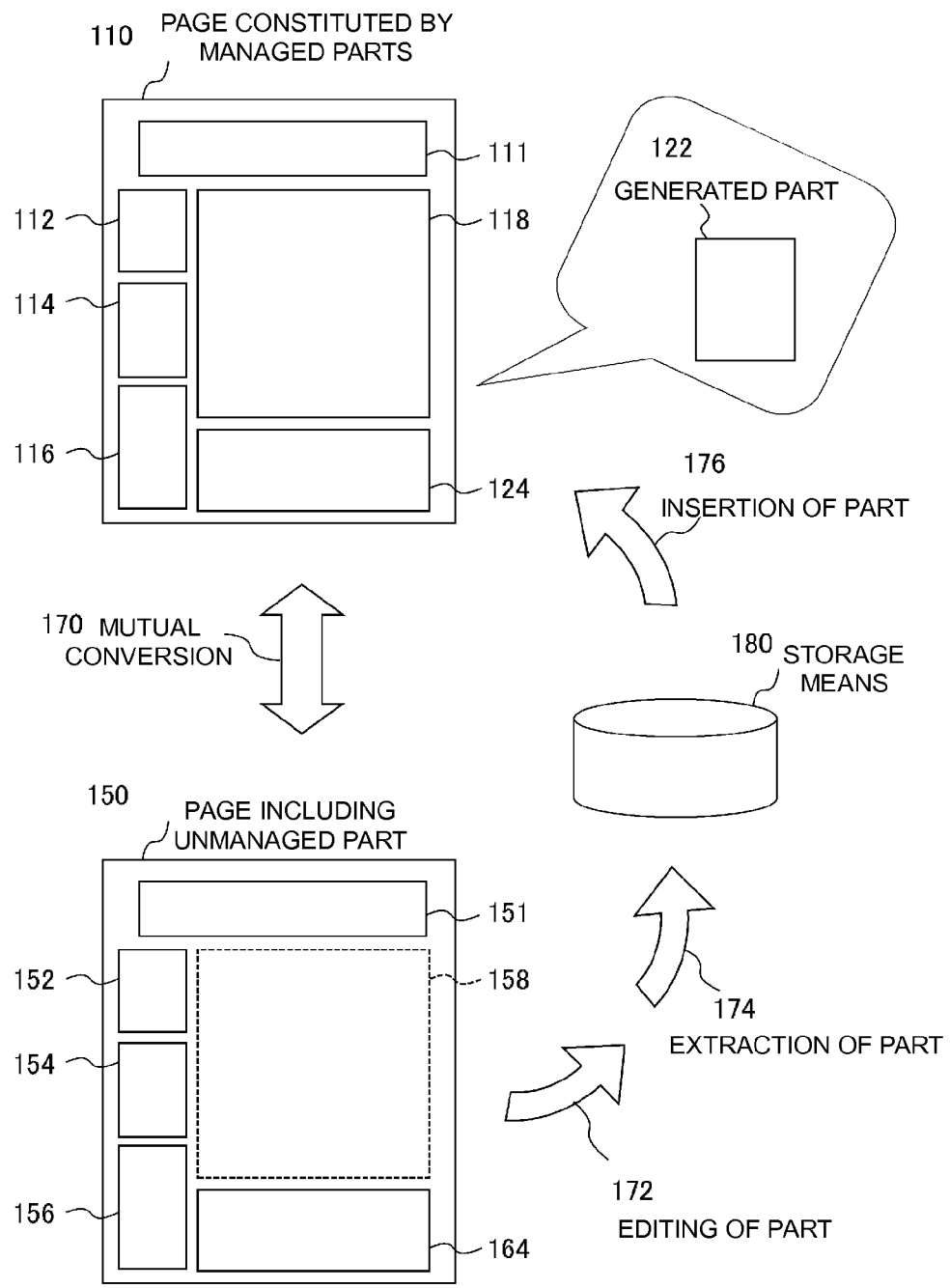
FIG. 1 is a schematic diagram showing the operation of a web page editing program according to an embodiment of the present invention.

FIG. 1 is a schematic diagram showing the operation of a web page editing program according to an embodiment of the present invention. In FIG. 1, a web page to be edited is shown as a page constituted by managed parts (page) 110 or a page including an unmanaged part (page) 150. The managed part refers to a part for a web page, which can be exclusively identified, for example, with a specific ID (identifier) or the like. The unmanaged part refers to a part which does not depend on a particular web page and which includes format, character attributes, layout information, and the like. First, the managed part and the unmanaged part will be described.

The page 110 can be stored in a computer-readable medium, as a web page in the form of a diary or the like accompanied, for example, by concrete sentences and/or pictures. For example, the page 110 may be a web page stored in a network resource or may be a blog or diary created by a user of the web page editing program in accordance with an embodiment of the present invention. The computer resource in which the page constituted by managed parts 110 is stored may be accessed via a network or may exist in a local machine. For example, the page 110 can be a web page which has a title of "Diary on Jan. 1, 2008," and the sentences, and pictures can be viewed by a viewer.

The page 110 appropriately includes a title area 111, a producer's profile area 112, an area for utility such as calendar 114, an area 116 for links to editing history, archives and the like, an article area 118, an area for receiving replies from viewers 124, and the like, as components. Each area included in the page 110, includes information which may include a specific ID, a producer's name, a creation date and time, and the category of the information, which can be referred to from the web page editing program according to the present invention. Furthermore, the information may include format, character attributes, layout information, and the like. The specific ID, and the like, may be information which identifies the page 110. Therefore, pieces of information included in the areas can be mutually associated via the specific ID at the time when the entire page 110 is stored in a computer-readable medium.

The page including an unmanaged part 150 indicates that information included in a partial area of the page 110 has been changed to an unmanaged part. For example, the area which has been changed to the unmanaged part includes format, character attributes, layout information, and the like, but does not include information about association with a particular web page. Specifically, the area changed to the unmanaged part may not include information such as a specific ID, a producer's name, a creation date and time, and the category of the information. However, the area changed to the unmanaged part can include format, character attributes, layout information, and the like.

For example, as components similar to those of the page 110, the page 150 includes a title area 151, a producer's profile area 152, an area for utility such as calendar 154, an area 156 for links to editing history, archives, and the like, and an area for receiving replies from viewers 164. An article area 158 is changed to an unmanaged part. That is, the article area 158 does not have information for identifying the information in the area, such as a specific ID, a producer's name, a creation date and time and a category, but it can include format, character attributes, layout information, and the like.

Various steps for editing a web by the web page editing program according to an embodiment of the present invention will be described below. In the web page editing program according to the present invention, change from the page 110 to the page 150, and a reverse change can be arbitrarily performed as mutual conversion 170. The mutual conversion 170 can be used, for example, in the case where the user of the web page editing program wants to insert format, layout, or the like within a partial range from a web page including a diary on a particular date, into a format or layout for a new diary or the like. By the operation of the mutual conversion 170, change is made in a part of the page 110 to generate a page 150 in an editable state.

The web page editing program can edit an area changed to an unmanaged part as a separate part. For example, the user can arbitrarily make a selection from the format, character attributes, or layout information included in the area changed into the unmanaged part, and edits it as desired. In another embodiment, the web page editing program can edit an area changed to an unmanaged part as a template. For example, by dividing the article area 158 to provide areas into which images such as pictures are to be inserted, the user may define a new document format. Such operation of the program or by the user is indicated as editing of part 172 after the page 150 is generated as illustrated in FIG. 1. The page 110 can be used as a template to edit part or all of the content for reuse.

The editing of part 172 or generation of the page 150 can be stored in a magnetic recording medium (not shown) by a user operation or by automatic storage. In one embodiment, the web page editing program according to the present invention can perform extraction of part 174, which is an operation of extracting a newly generated part in response to the storage operation. This newly generated part can be a generated part 122 shown in FIG. 1. The part extracted by the operation of the extraction of part 174 may be stored in storage means 180 such as a magnetic medium.

Furthermore, the web page editing program can insert the generated part 122 stored in the storage means 180, into a web page by the operation of insertion of part 176. For example, the user can insert the generated part 122 into a page constituted by managed parts 110, which has already been created, or a different web page. Thus, the user can use a partial area included in a web page as the generated part 122 during editing of the web page. The generated part 122 may be generated on the basis of an unmanaged part or may be generated on the basis of a managed part.

Figure 2:
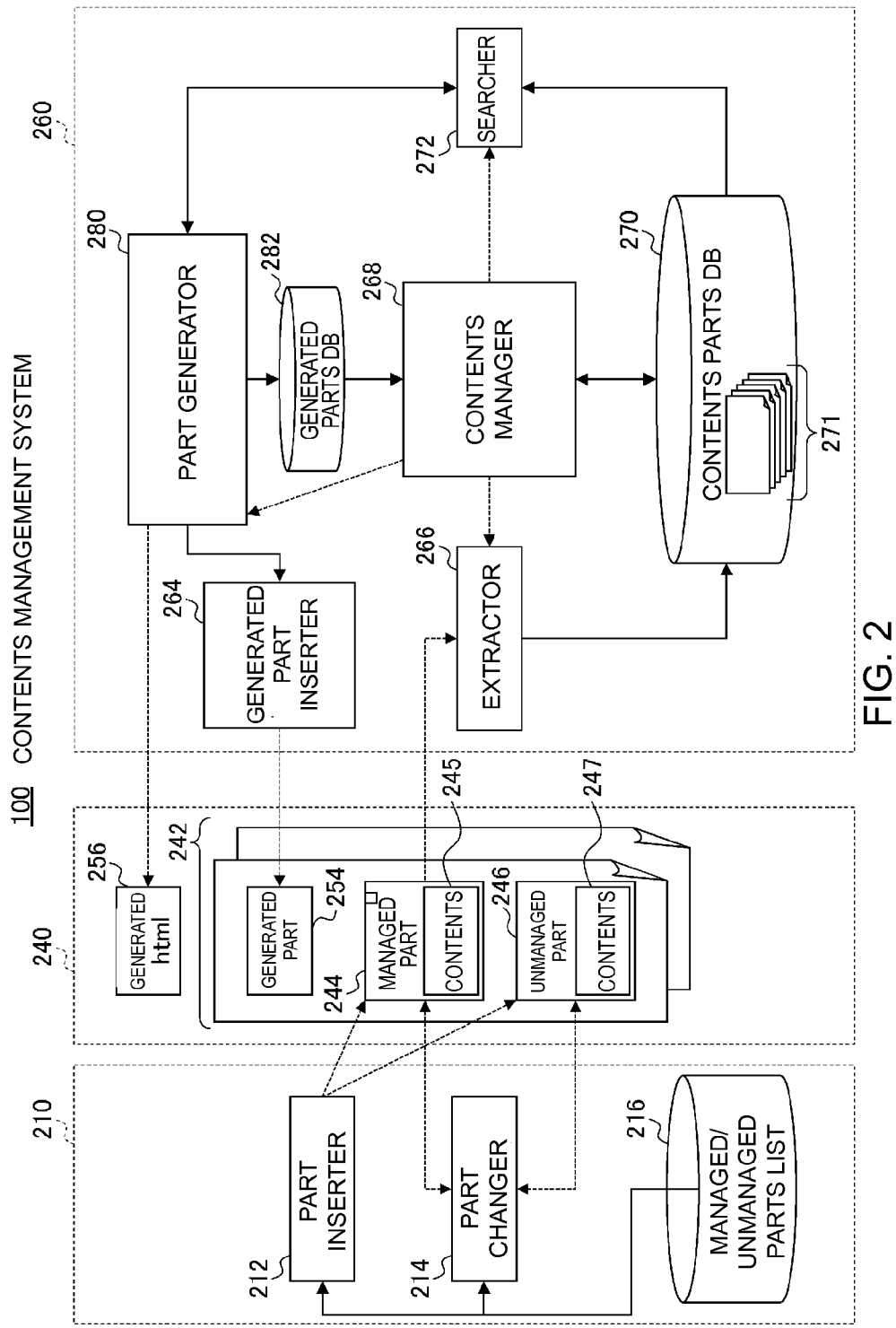
FIG. 2 is a diagram showing a contents management system 100 according to an embodiment of the present invention.

FIG. 2 illustrates a content management system 100 according to an embodiment of the present invention. The content management system 100 includes a parts management unit 210 and a contents management unit 260, and each is associated with a site component 240 comprising a web page.

The site component 240 can be a collection of information which can be displayed on a terminal screen with the use of software, such as a browser. Specifically, the site component 240 includes web page data 242 by the user who edits a web page, and generated web page data 256 to be generated by the contents management system 100 according to the present invention. The edited web page data 242 may comprise multiple pages, and it can include a managed part 244 and an unmanaged part 246 to be accessed by the parts management unit 210, and a generated part 254 to be accessed by the contents management unit 260. The managed part 244 and the unmanaged part 246 may include content 245 and 247, respectively.

The parts management unit 210 includes a part inserter 212, a part changer 214 and a managed/unmanaged parts list 216. The part inserter 212 executes the insertion of a web part into the edited web page data 242. The part changer 214 executes mutual exchange between a managed part 244 and an unmanaged part 246 included in the edited web page data 242. The managed/unmanaged parts list 216 is used to store web parts which can be handled by the parts management unit 210.

The contents management unit 260, includes a part generator 280, a generated part inserter 264, a generated parts database (DB) 282, a contents manager 268, an extractor 266, a searcher 272, and a contents parts DB 270. The contents part DB 270 uses contents part pages 271 to store parts for a web page.

The part generator 280 is used to generate a web part to be included in the site component 240. The part generator 280 may generate an HTML-format web part to make it generated web page data 256 which can be used in the site component 240. Alternatively, the part generator 280 may transmit the generated part to the generated part inserter 264 which may transmit the transmitted part to the site component 240 as a generated part 254. Furthermore, the part generator 280 can use the generated parts DB 282 for storage, retrieval, extraction and the like of the generated part.

In response to storage of a managed part 244, the extractor 266 can extract a web part or a component in any format included in the stored managed part 244. The storage may be performed by the user who is going to edit a web page or by automatic storage performed after elapse of specified time. The extractor 266 may extract, in response to generation of a new managed part 244 or unmanaged part 246 (including what is being edited), a component included in the managed part 244 or unmanaged part 246. The extracted component, web part or the like can be stored in the contents parts DB 270 via the extractor 266.

The contents manager 268 can manage various kinds of web parts transmitted or received inside the contents management unit 260. That is, the contents manager 268 can arbitrarily acquire information about web parts which are transmitted or received via the part generator 280, the extractor 266 or the contents parts DB 270. Furthermore, the contents manager 268 can retrieve and extract a web part or the like which satisfies predetermined conditions from among web parts stored in the contents parts DB 270 using the searcher 272 and generate a new web part via the part generator 280.

The user can manage each of the web parts included in the site component 240, as a managed part or as an unmanaged part, using the contents management system 100, and appropriately exchange it, for example, exchange managed data for unmanaged data, change from data including character information, image information and display attributes to data including only display attributes. As a further example, it is possible to store information for layout, such as character display attributes and definition of image display areas, about a web page currently being edited (which can be included in unmanaged parts) as a template, during editing of Web data having specific text or images (which can be included in managed parts). When the process of editing the site component 240, including the exchange, is stored by the user or the automatic storage function, the extractor 266 receives updated information about managed part 244 so that the contents parts DB 270 can be updated. The updated information is used for management of the contents parts DB 270 by the contents manager 268, generation of a web part by the part generator 280, and the like.

Thus, the user can not only edit a web page which can be included in the site component 240 or use web parts, but also perform free editing, including exchange of managed/unmanaged parts included in the site component 240, and acquire various web parts which can be used in the site component 240 from among various contents including updated managed parts, due to cooperation between the parts management unit 210 and the contents management unit 260.

Figure 3:
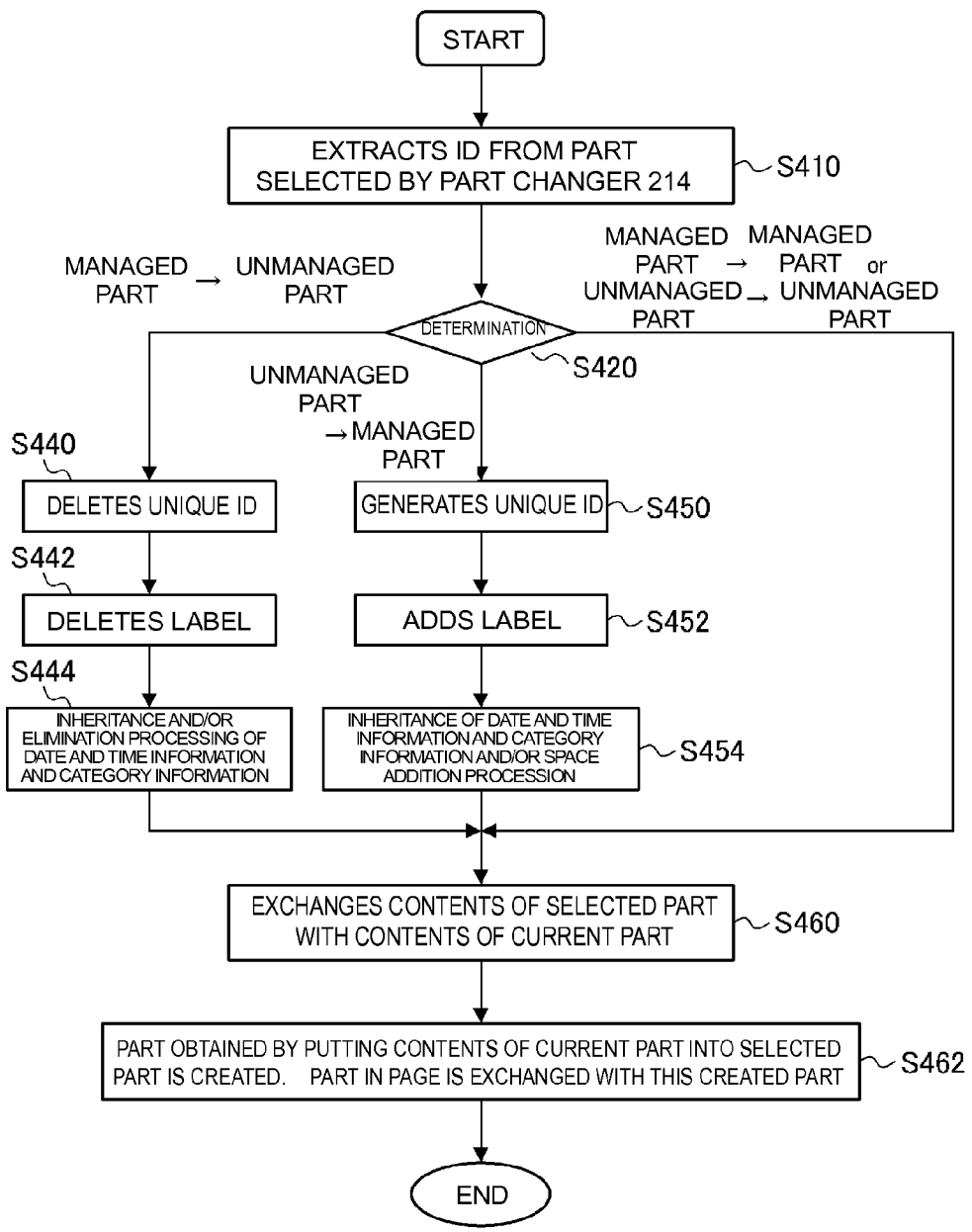
FIG. 3 is a flow diagram showing conversion of a part according to an embodiment of the present invention.

FIG. 3 is a flow diagram showing conversion of a part according to an embodiment of the present invention. Specifically, the part exchange flow diagram 400 corresponds to mutual exchange between a managed part 244 and an unmanaged part 246 included in the site component 240 by the part changer 214 shown with reference to FIG. 2.

In one embodiment, the contents management system 100 according to the present invention can perform an exchange of parts using the part changer 214. At S410, an ID is extracted from a part selected by the part changer 214. At S420, the flow branches on the basis of the extracted ID. The flow proceeds to S440 in the case of conversion from a managed part to an unmanaged part. The flow proceeds to S450 in the case of conversion from an unmanaged part to a managed part. The flow proceeds to S460 in the case of conversion from a managed part to a managed part or conversion from an unmanaged part to an unmanaged part.

At S440, a unique ID included in the managed part is deleted. At S442, a label included in the managed part is deleted. At S444, inheritance and/or elimination processing of date and time information and category information is performed. That is, if there is an area in which a date and time can be stored in the conversion destination unmanaged part, the date and time is inherited. Similarly, if there is an area in which the category can be stored in the conversion destination unmanaged part, the category is inherited. If such an area does not exist at the conversion destination, the elimination processing is performed. After S444, the flow proceeds to S460.

At S450, a unique ID is generated, and at S452, a label is added. At S454, inheritance and/or space addition processing of date and time information and category information is performed. That is, if there exists a recognizable date and time area in the unmanaged part, the contents are inherited. Similarly, if there is a recognizable category area in the unmanaged part, the contents are inherited. If such an area does not exist at the conversion source, a space for a date and time or a category is added. After S454, the flow proceeds to S460.

At S460, contents of the selected part and contents of the current part are exchanged. At S462, a part obtained by putting the contents of the current part into the selected part is created. The part within the page is exchanged with this created part.

Category information can be used by the searcher 272, as will be subsequently described in greater detail. The category information can be used for summary information (RSS feed), calendar with links, links according to categories, or links to articles, a managed parts list and the like.

Figure 4:
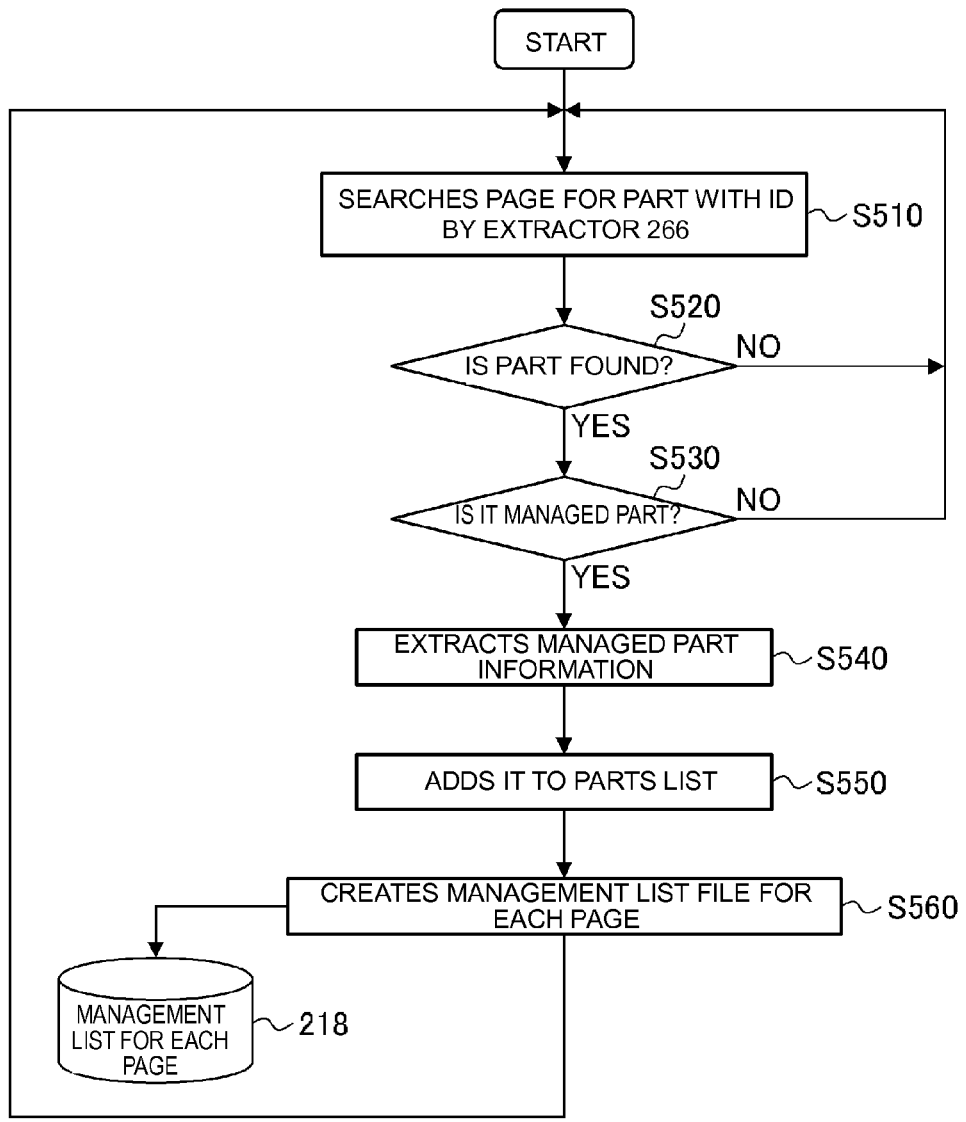
FIG. 4 is a flow diagram showing extraction of a managed part according to an embodiment of the present invention.

FIG. 4 is a flow diagram showing extraction of a managed part according to an embodiment of the present invention. Specifically, the managed part extraction flow diagram 500 corresponds to the operation of the extractor 266 included in the contents management unit 260 shown with reference to FIG. 2.

In one embodiment, the contents management system 100 can perform extraction of a managed part using the extractor 266. At S510, the page is searched by the extractor 266 for a part attached with an ID. At S520, it is judged whether the part exists. If it is true, the flow proceeds to S530. If it is false, the flow returns to S510.

At S530, it is judged whether the part is a managed part. If it is true, the flow proceeds to S540. If it is false, the flow returns to S510. At S540, managed part information is extracted, and at S550, the part is added to a parts list. At S560, a management list file for each page is created, and a management list for each page 218 is stored therein. The management list for each page 218 may be included in the contents parts DB 270. After S560, the flow returns to S510.

As shown with reference to FIG. 2, the operation of the extractor 266 can start in response to storage of a managed part 244. For example, the extractor 266 may wait at S510 until storage of a managed part 244 occurs due to a user's editing operation or automatic storage. That is, when the extractor 266 starts operation after the contents management system 100 is activated, the operation of the extractor 266 enters a waiting state at S510 in the flow diagram shown in FIG. 4. Each time storage of a managed part 244 occurs due to a user's editing operation or automatic storage, a loop including S560 can be executed.

Figure 5:
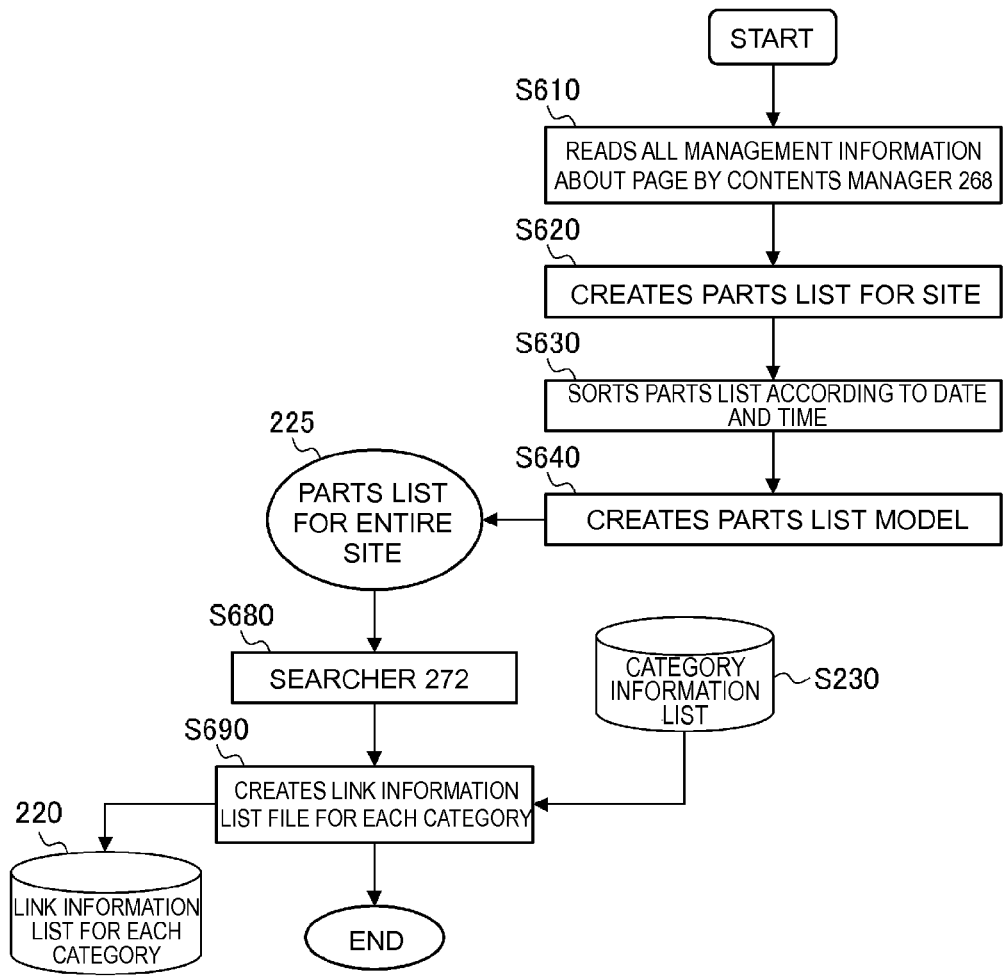
FIG. 5 is a flow diagram showing the operation of the contents manager 268 and the searcher 272 according to an embodiment of the present invention.

FIG. 5 is a flow diagram showing the operation of the contents manager 268 and the searcher 272 according to an embodiment of the present invention. Specifically, the flow diagram 600 of the operation of the contents manager 268 and the searcher 272 corresponds to the operation of the contents manager 268 included in the contents management unit 260 shown with reference to FIG. 2.

In one embodiment, the contents management system 100 can create a parts list file using the contents manager 268 and the searcher 272 in accordance with the following procedure. At S610, all management information about a page is read from the contents manager 268. At S620, a parts list for a site is created. At S630, the parts are sorted according to the date and time.

At S640, a parts list model is created. The parts list model may be stored as a set, for example, as a parts list for the entire site 225. The contents parts DB 270 or the like may be used for the storage. At S680, the searcher 272 is caused to operate, and a web part which satisfies predetermined conditions is retrieved and extracted from the parts list for the entire site 225. The predetermined conditions may be, for example, conditions for successful creation of a link information list file for each category. For example, when a web page being edited by the user is included in the site component 240 shown in FIG. 2, the searcher 272 can extract link information which may be related to the web part from the parts list for the entire site 225 on the basis of category information included in the web page.

At S690, a link information list file for each category is created with a category information list 230, and a link information list for each category 220 is stored therein. The category information list 230 and the link information list for each category 220 may be included in the contents parts DB 270.

Figure 6:
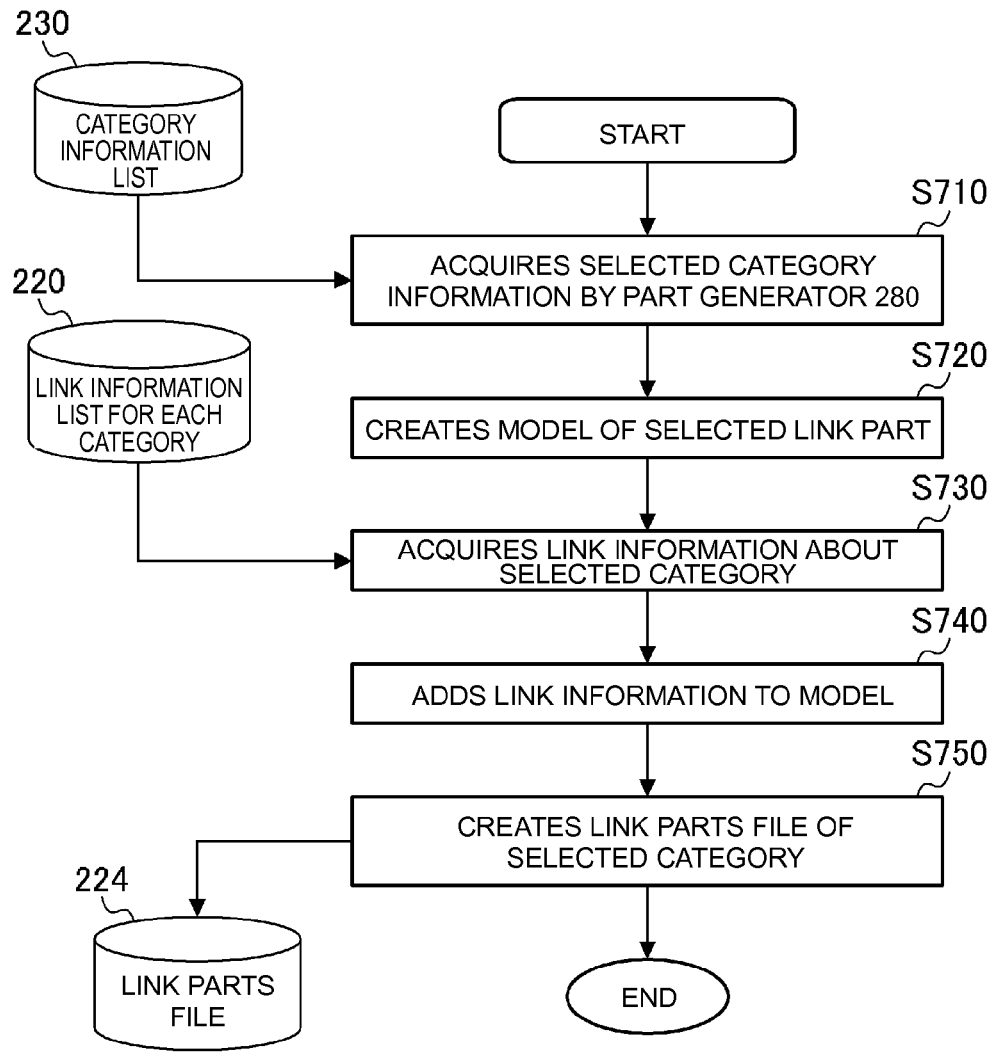
FIG. 6 is a flow diagram showing the operation of the part generator 280 according to an embodiment of the present invention.

FIG. 6 is a flow diagram showing the operation of the part generator 280 according to an embodiment of the present invention. Specifically, the flow diagram 700 of the operation of the part generator 280 corresponds to the operation of the part generator 280 included in the contents management unit 260 shown in FIG. 2.

In one embodiment, the contents management system 100 can generate a web part with the part generator 280. For example, a case is assumed where the user is editing a web page and wants to use a web part belonging to a particular category for the editing.

At S710, selected category information is acquired by the part generator 280. For example, the category information list 230 may be used to acquire the category information. The category information list 230 may be included in the contents parts DB 270. At S720, a model of a selected link part is created. Specifically, the model can be a template or the like.

At S730, link information about a selected category is acquired. The link information list for each category 220 may be used to acquire the link information. The link information list 220 may be included in the contents parts DB 270. At S740, the link information is added to the model.

At S750, a link parts file of the selected category is created. The created link parts file may be stored, for example, in a link parts file 224. The link parts file 224 may be included in the generated parts DB 282 shown in FIG. 2, or may be included in the contents parts DB 270 as the parts list for the entire site 225 as shown in FIG. 5 and targeted by search and extraction by the searcher 272.

Figure 7:
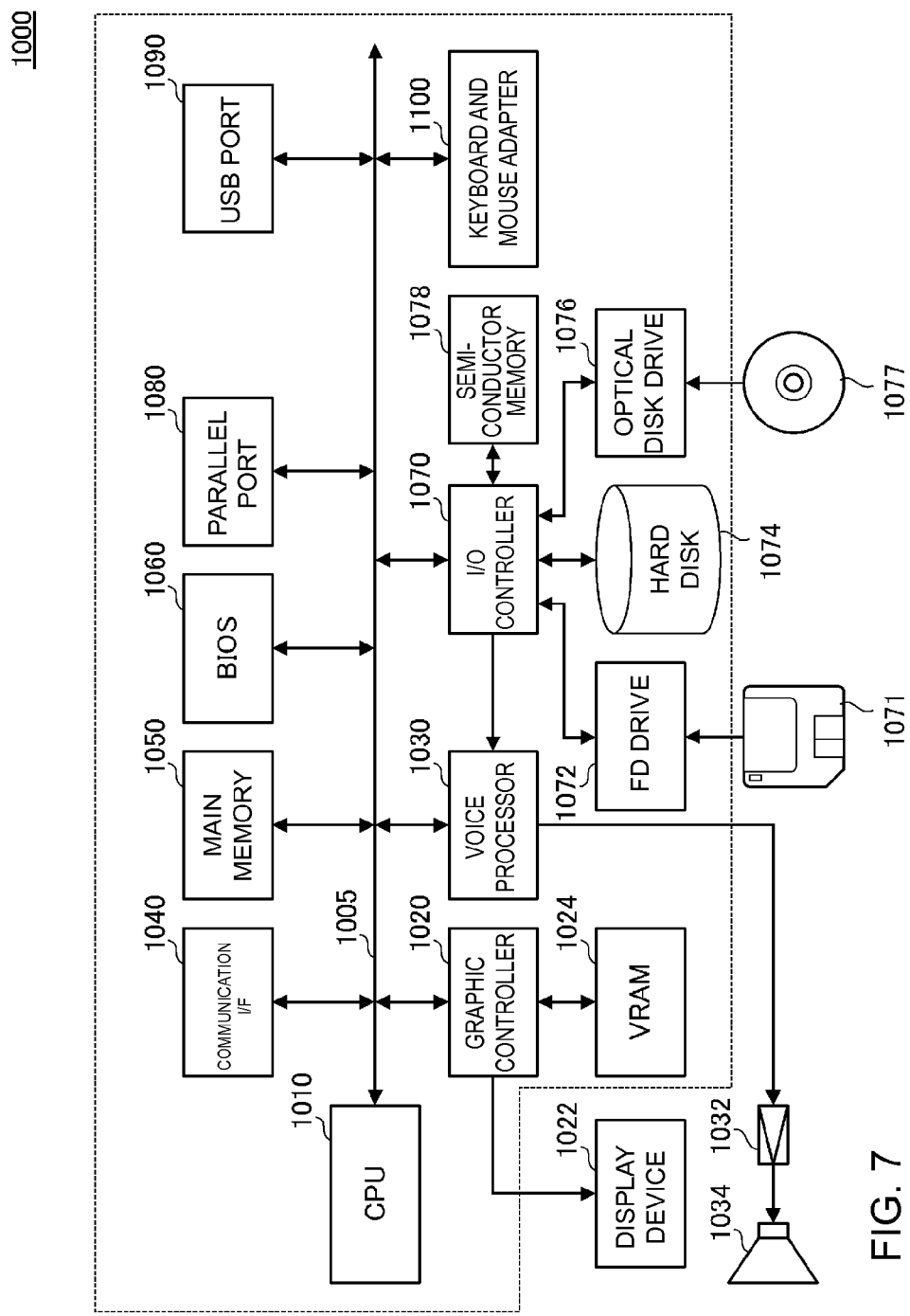
FIG. 7 is a diagram showing the hardware configuration of a contents management apparatus according to an embodiment of the present invention.

FIG. 7 is a diagram showing the hardware configuration of a contents management apparatus according to an embodiment of the present invention. In FIG. 7, the contents management apparatus is shown as an information processing apparatus 1000, and its hardware configuration is illustrated. The general configuration will be described below with the contents management apparatus as an information processing apparatus typified by a computer.

The information processing apparatus 1000 is provided with a CPU (Central Processing Unit) 1010, a bus line 1005, a communication I/F 1040, a main memory 1050, a BIOS (Basic Input Output System) 1060, a parallel port 1080, a USB port 1090, a graphic controller 1020, a VRAM 1024, a voice processor 1030, an I/O controller 1070, and input devices such as a keyboard and mouse adapter 1100. To the I/O controller 1070, storage means, such as a flexible disk (FD) drive 1072, a hard disk 1074, an optical disk drive 1076 and a semi-conductor memory 1078, can be connected.

To the voice processor 1030, a microphone (not shown), an amplification circuit 1032 and a speaker 1034 are connected. To the graphic controller 1020, a display device 1022 is connected.

In the BIOS 1060, there is a boot program to be executed by the CPU 1010 when the information processing apparatus 1000 is activated and programs dependent on the hardware of the information processing apparatus 1000. The flexible disk (FD) drive 1072 reads a program or data from a flexible disk 1071, and provides it to the main memory 1050 or the hard disk 1074 via the I/O controller 1070. Though FIG. 7 shows an example in which the hard disk 1074 is included inside the information processing apparatus 1000, it is also possible to connect an interface for connection of external equipment (not shown) to the bus line 1005 or the I/O controller 1070, and connect or add a hard disk outside the information processing apparatus 1000.

As the optical disk drive 1076, for example, a DVD-ROM drive, a CD-ROM drive, a DVD-RAM drive or a CD-RAM drive can be used. In this case, it is necessary to use an optical disk 1077 suitable for each drive. The optical disk drive 1076 can also read a program or data from the optical disk 1077 and provide it to the main memory 1050 or the hard disk 1074 via the I/O controller 1070.

A computer program provided for the information processing apparatus 1000 is stored in a storage medium, such as the flexible disk 1071, the optical disk 1077, or a memory card provided by a user. The computer program can be installed in the information processing apparatus 1000 and executed by being read from the recording medium via the I/O controller 1070 or by being downloaded via the communication I/F 1040.

The computer program described above may be stored in an external recording medium. As the recording medium, a magneto-optical medium, such as an MD, and a tape medium can be used in addition to the flexible disk 1071, the optical disk 1077 and the memory card. Furthermore, it is also possible to use a storage device as a storage medium, such as a hard disk and an optical disk library provided in a server system connected to a dedicated communication line or the Internet, and provide the computer program for the information processing apparatus 1000 via the communication line.

In the above example, description has been made mainly on the information processing apparatus 1000. However, it is possible to realize functions similar to those of the information processing apparatus described above by installing a program having the functions described with relation to the information processing apparatus and causing the computer to operate as the information processing apparatus.

The apparatus can be realized as hardware, software, or combination of hardware and software. As a typical example of implementation by combination of hardware and software, implementation in a computer system having a predetermined program is given. In such a case, by being loaded onto the computer system and executed, the predetermined program causes the computer system to execute the processing according to the present invention. This program is constituted by a group of commands which can be expressed in any language, codes or notation. Such a group of commands enables the system to directly execute a particular function or to execute the particular function after execution of any one or both of (1) conversion to a different language, codes or notation and (2) reproduction onto a different medium. Of course, the present invention includes not only the program itself but also a program product including a medium in which the program is recorded, within the scope thereof. The program for executing the functions of the present invention can be stored in any computer-readable medium, such as a flexible disk, MO, CD-ROM, DVD, hard disk device, ROM, MRAM and RAM. Such a program can be downloaded from a different computer system connected via a communication line or reproduced from a different medium to be stored in the computer-readable medium. Furthermore, such a program can be compressed or divided into multiple parts to be stored in a single or multiple recording media.

The components of the program for managing contents according to the present invention and the format of related data will be described below by showing specific examples. However, it should be understood that various changes can be made in the specific examples, and the changed embodiments are also included within the scope of the present invention.

The managed part 244 according to an embodiment shown in FIG. 2 can include data in the format shown in the following table as a managed part such as a diary.

TABLE 1

| Field | Data |
| --- | --- |
| ID | HPB_LPT_DBOX_005M_CN080829111208 |
| Unique information about ID | CN080829111208 |
| Label to top of parts | CN080829111208 |
| Creation date and time | 11:12 August 29, 2008 |
| Category | Diary |

In table 1, the unique information about ID can be set to identify multiple data associated with the same ID. The label to the top of parts is used to associate mutual relationships among various web parts stored in the contents parts DB 270. This managed part 244 is generated, for example, as a part of content included in a web page, as shown in the following expression by the web page editing program according to the present invention, and can be stored in a computer-readable medium as HTML-format text. The managed part 244, an example of which is shown in the following expression, has, for example, a field including a date and time (exclusively identified by substituting "HPB_LP_H0_CN080829111208" for the ID) and a field including a category (exclusively identified by substituting "HPB_LP_C0_CN080829111208" for the ID), as information for management. Editing of the creation date and time and the category of the managed part by the user for a normal editing area is restricted.

[Expression 1]

```
<DIV id="HPB_LPT_DBOX_005M_CN080829111208" class=
"hpb-lay-photol">
<A name="CN080829111208"></A>
<TABLE width="100%" border="0" cellspacing="0" cellpadding=
   "0" class="HPB_QTMPL_PROTECT">
<TBODY>
   <TR><TD id="HPB_LP_H0_CN080829111208"
         class="hpb-subh02-cell1"> 11:12, August 29,
         2008</TD></TR>
   <TR><TD id="HPB_LP_T0_CN080829111208"
         class="hpb-subh02-cell4 HPB_QTMPL_EDIT">
         Title of diary </TD></TR>
</TBODY>
</TABLE>
<TABLE width="100%" border="0" cellspacing="0" cellpadding="0"
   class="hpb-dp-tb4 HPB_QTMPL_PROTECT">
<TBODY>
   <TR><TD align="left" valign="top"
         id="HPB_LP_C0_CN080829111208"
         class="hpb-dp-tb4-cell5 HPB_QTMPL_EDIT">
         Keeps diary here.   </TD>
   <TD width="186" valign="top" id="HPB_LP_P0_CN080829111208"
class="hpb-dp-tb4-cell6 HPB_QTMPL_EDIT"><IMG src=""
width="186"></TD></TR>
</TBODY>
</TABLE>
<TABLE width="100%" border="0" cellpadding="0" cellspacing="0"
   class="HPB_QTMPL_PROTECT">
<TBODY>
   <TR><TD id="HPB_LP_F0_CN080829111208"
         class="hpb-dp-tb1-cell3" align="right"> Category: diary
         </TD></TR>
</TBODY>
</TABLE>
</DIV>
```

The unmanaged part 246 as shown in FIG. 2 can include data in the format shown in the following table as an unmanaged part such as a diary. In the example shown in the following table, the ID is "HPB_LPT_DBOX_005". This is an ID obtained by removing the character "M", which is an example of information indicating that the part is a managed part, from the ID "HPB_LPT_DBOX_005M" of the above-described managed part, and it indicates that the parts are a combination of parts which can be mutually exchanged. Unlike the example of the managed part 244 described above, the unmanaged part 246 does not include a field for category. Furthermore, as for the label to the top of parts, only a field exists without data in the following example. Thus, a field may be selected so that data may not be included.

TABLE 2

| Field | Data |
|---|---|
| ID | HPB_LPT_DBOX_005 |
| Unique information about ID | _CN080829111208 |
| Label to top of parts | None |
| Creation time and date | 11:12 August 29, 2008 |

This unmanaged part 246 is generated, for example, as a part of contents included in a web page, as shown in the following expression by the web page editing program, and can be stored in a computer-readable medium as HTML-format text. Unlike the example of the managed part 244 described above, the unmanaged part 246, an example of which is shown in the following expression, does not include the field including a date and time or a field including a category. An editing-restricted area is not set for an unmanaged part.

[Expression 2]

```
<DIV id="HPB_LPT_DBOX_005" class="hpb-lay-photol"><BR>
<TABLE width="100%" border="0" cellspacing="0" cellpadding="0"
   class="hpb-subh02">
<TBODY>
   <TR><TD id="HPB_LP_H0"
         class="hpb-subh02-cell1"> 11:12,
         August 29, 2008 </TD></TR>
   <TR><TD id="HPB_LP_T0"
         class="hpb-subh02-cell4"> Title of diary </TD ></TR>
</TBODY>
</TABLE>
<TABLE width="100%" border="0" cellspacing="0" cellpadding="0"
   class="hpb-dp-tb4">
<TBODY>
   <TR><TD align="left" valign="top"
         id="HPB_LP_C0"
         class="hpb-dp-tb4-cell5">  Keeps diary here.   </TD>
   <TD width="186" valign="top" id="HPB_LP_P0" class="hpb-dp-tb4-
   cell6"><IMG src=""width="186"></TD></TR>
</TBODY>
</TABLE>
</DIV>
```

The management list for each page 218 according to an embodiment shown in FIG. 4 can be managed, for example, with the use of xml-format text like the following expression. In the example of the following expression, it is indicated that a collection of diary data identified with a particular ID "HPB_LPT_DBOX_005M" is managed. Therefore, the above-described managed part the ID of which is "HPB_LPT_DBOX_005M" and the above-described unmanaged part the ID of which is "HPB_LPT_DBOX_005" can be included in the set of the management list for each page 218.

[Expression 3]

```
<?xml version="1.0" encoding="UTF-8"?>
<partmngdoc>
  <pageinfo>
    <sitename>  New site 5 </sitename>
    <pagename>index.html</pagename>
    <pagetitle>Information</pagetitle>
    <savetime>2008/08/29 18:13:47</savetime>
  </pageinfo>
  <partinfo>
   <contentpart usage="content_cms">
     <id>HPB_LPT_DBOX_005M_CN080829181337</id>
     <title>  Title of diary </title>
     <creationTime>2008/08/29 18:13:00</creationTime>
     <category>Diary</category>
     <link>index.html#CN080829181337</link>
   </Contentpart>
  </partmngdoc>
```

The link information list for each category 220 shown in FIGS. 5 and 6 can be managed, for example, with the use of xml-format text like the following expression. In the example of the following expression, it is indicated that diary data corresponding to three days are managed as a collection of three data with different ID's. That is, each of the diary data whose ID's are "HPB_LPT_DBOX_007M", "HPB_LPT_DBOX_005M" and "HPB_LPT_DBOX_004M", can be independently handled.

[Expression 4]

```
<?xml version="1.0" encoding="UTF-8"?>
<partinfo>
 <contentpartusage="content_cms">
   <id>HPB_LPT_DBOX_007M_CN080807155314</id>
   <title> Title of diary 1 </title>
   <creationTime>2008/8/30</creationTime>
   <category>Diary</category>
   <link>sub 1 html#CN080807155314</link>
 </contentpart>
 <contentpartusage="content_cms">
   <id>HPB_LPT_DBOX_005M_CN080829181337</id>
   <title> Title of diary 2</title>
   <creationTime>2008/08/29 18:13:00</creationTime>
   <category>Diary</category>
   <link>index.html#CN080829181337</link>
 </contentpart>
 <contentpart usauge="content_cms">
   <id>HPB_LPT_DBOX_004M_CN080828142704</id>
   <title> Title of diary 3 </title>
   <creationTime>2008/08/28 14:27:00</creationTime>
   <category>Diary</category>
   <link>index.html#CN080828142704</link>
 </contentpart>
</partinfo>
```

The category information list 230 shown in FIGS. 5 and 6 can be managed, for example, with the use of xml-format text like the following expression. In the following expression, an example of managing the categories of managed parts using a variable "category numid" for distinguishing the categories by integer values is shown.

[Expression 5]

```
<?xml version="1.0" encoding="UTF-8"?>
<categorymngdoc>
 <category numid="0">
   <name> Latest article</name>
   <icon>
   </icon>
  </category>
  <category numid="1">
  <name>Diary</name>
   <icon>
   </icon>
  </category>
  <category numid="2">
   <name>Information</name>
   <icon>
   </icon>
  </category>
  <category numid="3">
   <name>None</name>
   <icon>
   </icon>
  </category>
</categorymngdoc>
```

A link part included in a link parts file 224 shown in FIG. 6 can be described, for example, with the use of HTML-format text as the following expression. A link part can be provided for the user, for example, as a calendar-type link, a list-type link, the latest article, information or the like.

[Expression 6]

```
<DIV id="hpbsitec000table000001"
style="width: 143px;margin: 3px;float:left;">
```

[Expression 6] -continued

```
<TABLE width="100%" border="0" cellpadding="2" cellspacing="0">
<TBODY>
<TR><TD align="center" class="hpb-colm0-cell1"> Latest article </TD></TR>
<TR><TD class="hpb-colm0-cell2">
<UL class="hpb-list1">
<LI><A href= "sub1.html#CN080807155314"
      class= "hpb-vmenucl-link1" >  Title of Diary 1   </A>
<LI><A href= "index.html#CN080829181337"
      class= "hpb-vmenucl-link1" >  Title of Diary 2   </A>
<LI><A href= "index.html#CN080828142704"
      class= "hpb-vmenucl-link1" >  Title of Diary 3   </A>
</UL>
</TD></TR>
</TBODY>
</TABLE>
</DIV>
```

The present invention has been described in accordance with several embodiments. However, the present invention is not limited to the embodiments described above. The advantages described in the embodiments of the present invention are only the most preferable advantages that occur from the present invention, and the advantages of the present invention are not limited to those described in the embodiments or the examples of the present invention.

What is claimed is:

1. A method of editing a non-editable managed web part area on a web page, comprising:
converting, with a processor, a non-editable managed web part area into an editable unmanaged web part area, said non-editable managed web part area comprising a specific ID associating said non-editable managed web part area to a specific web page, a creation date and time of said non-editable managed web part area, and a category of information of said non-editable managed web part area, said converting comprising removing said said specific ID, said creation date and time, and said category of information from said non-editable managed web part area;
editing said unmanaged part area by changing at least one of format, character attribute, or layout information; and
storing, in a memory, said unmanaged part area, as edited, for subsequent use on a web page.

2. The method of claim 1, comprising converting, with a processor, said editable unmanaged part area into a non-editable managed part area by adding a new specific ID, a new creation date and time, and a new category of information.

3. The method of claim 1, further comprising converting, with said processor, the non-editable managed part area into an unmanaged part area template.

4. The method of claim 1, wherein said non-editable managed web part area further comprises a name of a producer of said non-editable managed web part area.

5. the method of claim 1, further comprising adding new web part areas to said unmanaged web part area.

6. A system for editing a non-editable managed web part area on a web page, comprising:
a processor; and
memory connected to the processor, wherein the memory is encoded with instructions and wherein the instructions when executed comprise:
instructions for converting a non-editable managed web part area into an editable unmanaged web part area, said non-editable managed web part area comprising a specific ID associating said non-editable managed web part area to a specific web page, a creation date and time of said non-editable managed web part area, and a category of information of said non-editable managed web part area, said converting comprising removing said said specific ID, said creation date and time, and said category of information from said non-editable managed web part area;

instructions for editing said unmanaged part area by changing at least one of format, character attribute, or layout information; and instructions for storing said unmanaged part area, as edited, for subsequent use on a web page.

7. The system of claim 6, comprising instructions for converting said editable unmanaged part into a non-editable managed part area into a non-editable managed part area by adding a new specific ID, a new creation date and time, and a new category of information.

8. The system of claim 6, further comprising instructions for converting the non-editable managed part area into an unmanaged part area template.

9. The system of claim 6, wherein said non-editable managed web part area further comprises a name of a producer of said non-editable managed web part area.

10. The system of claim 6, further comprising instructions for adding new web part areas to said unmanaged web part area.

11. A computer program product for editing a non-editable managed web part area on a web page, comprising a computer readable storage medium having computer readable program code embodied therewith, the computer readable program code comprising:

computer readable program code configured to convert the non-editable managed web part area into an editable unmanaged web part area, said non-editable managed web part area comprising a specific ID associating said non-editable managed web part area to a specific web page, a creation date and time of said non-editable managed web part area, and a category of information of said non-editable managed web part area, said converting comprising removing said specific ID, said creation date and time, and said category of information from said non-editable managed web part area;

computer readable program code configured to edit said unmanaged part area by changing at least one of format, character attribute, or layout information; and computer readable program code configured to store said unmanaged part area, as edited, for subsequent use on a web page.

12. The computer program product of claim 11, comprising computer readable program code configured to convert said unmanaged part area into a non-editable managed part area by adding a new specific ID, a new creation date and time, and a new category of information.

13. The computer program product of claim 11, further comprising computer readable program code configured to convert the non-editable managed part area into an unmanaged part area template.

14. The computer program product of claim 11, wherein said non-editable managed web part area further comprises a name of a producer of said non-editable managed web part area.

15. The computer program product of claim 11, further comprising computer readable program code configured to add new web part areas to said unmanaged web part area.

16. The method of claim 4, comprising converting, with a processor, said non-editable managed part area into an editable unmanaged part area by removing said name of a producer, said specific ID, said creation date and time, and said category of information.

17. The system of claim 9, comprising instructions for converting said non-editable managed part area into an editable unmanaged part area by removing said name of a producer, said specific id, said creation date and time, and said category of information.

18. The computer program product of claim 14, comprising computer readable program code configured to convert said non-editable managed part area into an editable unmanaged part area by removing said name of a producer, said specific id, said creation date and time, and said category of information.

* * * * *